United States Patent Office 2,820,782
Patented Jan. 21, 1958

2,820,782

COBALT-CONTAINING AZO DYESTUFFS OF THE ACYLACETYLAMINOALKANE SERIES

Piero Maderni, Basel, and Walter Wehrli, Riehen, Switzerland, assignors to Saul & Co., Newark, N. J., as Nominee of Fidelity Union Trust Company, Executive Trustee, under Sandoz Trust No Drawing. Application May 6, 1954
Serial No. 428,132

Claims priority, application Switzerland May 9, 1953

10 Claims. (Cl. 260—145)

Cobalt-containing azo dyestuffs of the acetylaminoalkane series, which dye animal and nitrogen-containing synthetic fibers in yellow shades and which are derived from monoazo dyestuffs of the formula

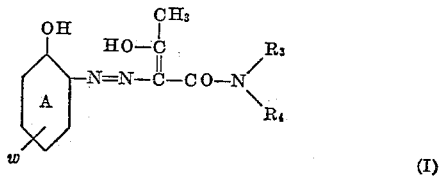

(I)

wherein $w$ stands for a sulfonic acid amide group which may be substituted at the nitrogen atom, $R_3$ represents an alkyl group with 1 to 4 carbon atoms, and $R_4$ stands for hydrogen or an alkyl group with 1 to 4 carbon atoms, and wherein nucleus A may be further substituted, are known. However, the properties of these dyestuffs are not entirely satisfactory; thus for example the neutral affinity thereof for synthetic polyamide fibers leaves something to be desired, and the shades of the dyeings on animal and nitrogen-containing synthetic fibers are often undesirably shifted to the red. This may be illustrated by the cobalt-containing azo dyestuff which is obtained by coupling diazotized 1 - hydroxy - 2 - aminobenzene - 4 - sulfonic acid methylamide with the dibutylamide of acetoacetic acid, and cobaltizing the so-obtained monoazo dyestuff. This cobalt-containing dyestuff is but incompletely exhausted from a neutral bath onto the said fibers; the latter are dyed in orange-colored shades.

A primary object of the present invention is the embodiment of a group of cobalt-containing azo dyestuffs of the acylacetylaminoalkane series which are free of the aforedescribed defects, i. e. which have an outstanding neutral affinity for animal and nitrogen-containing synthetic fibers and which dye the latter in valuable greenish yellow shades.

This object is realized according to the present invention by the group of cobalt-containing azo dyestuffs which are prepared by coupling one mol of the diazo compound of an aminobenzene of the formula

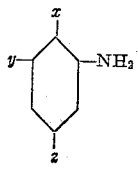

(II)

wherein $x$ stands for —OH or —OCH$_3$, $y$ stands for hydrogen, —CH$_3$ or —NHCOCH$_3$, and $z$ stands for —SO$_2$—alkyl, and —SO$_2$—NHR″,

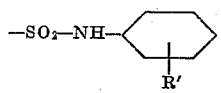

or

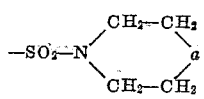

$R'$ representing H, Cl, CH$_3$ or —SO$_2$—NHR″, R″ being H, alkyl or alkoxyalkyl, $a$ representing a simple bond or —O—, alkyl being lower alkyl throughout, with (i) one mol of an acylacetylaminoalkane of the formula

(III)

where $R_1$ represents an alkyl group with at least 6 and at most 18 carbon atoms, and $R_2$ stands for lower alkyl or aryl, or with (ii) one mol of a mixture of two or more acylacetylaminoalkanes of Formula III, and then treating the resultant monoazo dyestuff or mixture of two or more monoazo dyestuffs with a cobalt-yielding agent.

It could not be foreseen and is wholly unexpected that the compounds according to the present invention—for example, the cobalt complex compounds of the monoazo dyestuffs from diazotized 1-hydroxy-2-aminobenzene-4-sulfonic acid methylamide and the 1-dimethyl-3-dimethylbutyl(1) - amide or the 1 - octylamide of acetoacetic acid—which are e. g. isomeric with the aforementioned cobalt-containing dyestuff containing the dibutylamide of acetoacetic acid as azo component, would possess the surprising property of excellent neutral drawing capacity and would yield a valuable greenish yellow shade on wool and nitrogen-containing synthetic fibers.

The coupling of the diazo compounds with the acylacetylaminoalkanes, according to the invention, is preferably carried out in alkaline medium. It is often necessary to work with emulsions or suspensions, since the acylacetylaminoalkanes are generally gels or solids, which are not soluble in water. The obtained dyestuffs are advantageously separated from the alkaline coupling masses by the addition of hydrochloric acid, in some cases after preliminary decantation and dissolution of the reaction products in dilute aqueous caustic soda solutions.

Valuable products are also obtained when the diazo compounds are coupled, not with a single azo component but with a mixture of two or more azo components. The so-obtained mixtures can be subjected to metallization without prior separation thereof into the individual components.

The metallization of the monazo compound or of the mixture of monoazo compounds is preferably carried out with cobalt acetate, cobalt formate or cobalt sulfate, in aqueous suspension or solution or in organic medium, for example in formamide or in molten alkali metal salt of a low molecular aliphatic monocarboxylic acid. In the latter case, insoluble metal compounds—such as cobalt hydroxide or cobalt carbonate—may also be used. Metallization in aqueous caustic alkaline medium is particularly advantageous, the metal salts being added in the presence of compounds which keep cobalt dissolved in complex combination in caustic alkaline medium, e. g. tartaric acid, citric acid, lactic acid, etc. In the event that $x$ in the formula of the aminobenzene which is used in preparing the diazo compound is —$OCH_3$, the metallization is carried out under conditions which bring about a splitting of the methoxy group, e. g. by heating the monoazo dyestuff to temperatures above 100° C. in an organic medium.

Particularly valuable cobalt-containing azo dyestuffs are obtained when less than one atom of cobalt is introduced per molecule of monoazo dyestuff and, for example, so-called 1:2-complexes are prepared which correspond to the formula

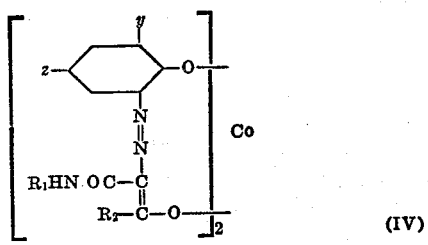

(IV)

In this formula, symbols $y$, $z$, $R_1$ and $R_2$ have the previously-indicated significances. If the metallization of the mixture of monoazo compounds is carried out in the 1:2 relation, the end products are mixtures of symmetrical and unsymmetrical cobalt-containing compounds.

The obtained cobalt-containing azo dyestuffs are separated from the metallization solutions generally by the addition of sodium chloride, followed by filtration, washing (if necessary), and drying. The products have an outstanding neutral drawing capacity and dye wool and silk from a neutral to weakly acid dyebath in valuable greenish yellow shades, which are even and full, of excellent fastness to light and of very good fastness to fulling and to washing. The new dyestuffs are also very excellently suitable for the dyeing of leather and especially of nitrogen-containing synthetic fibers, e. g. of synthetic polyamide fibers such as those sold commercially as nylon, Perlon, etc.

The following examples illustrate the invention, but are not intended to be limitative thereof. In these examples, the parts and percentages are by weight, and the temperatures are in degrees centigrade.

EXAMPLE 1

20.2 parts of 2-amino-1-hydroxybenzene-4-sulfonic acid methylamide are diazotized. The resultant diazo suspension is run, at 0–5°, into a vigorously stirred emulsion of 22 parts of 1-acetoacetylamino-hexane, 40 parts of sodium carbonate, approximately 27 parts of an aqueous sodium hydroxide solution of 30% strength, and 300 parts of water. The resultant resinous monoazo dyestuff is, after decantation, dissolved in dilute aqueous sodium hydroxide solution, whereupon the solution is slowly acidified at 20° with hydrochloric acid. The precipitated dyestuff is filtered off and then dried at 25–30° under reduced pressure. A brown powder is obtained which dissolves with reddish yellow coloration in dilute aqueous sodium hydroxide solution and with greenish yellow coloration in concentrated sulfuric acid.

Conversion into the cobalt complex compound is carried out as follows:

8.6 parts of the monoazo dyestuff, obtained according to the first paragraph of the present example, are suspended in 100 parts of water. A cobalt-sodium-tartrate solution, consisting of 3.5 parts of crystalline cobalt sulfate, 19.3 parts of aqueous tartaric acid solution of 4.8% strength and 4.7 parts of aqueous sodium hydroxide solution of 30% strength, is stirred into the suspension at 25°. The resultant cobalt complex compound precipitates; it is brought into solution by the addition of sodium hydroxide to the metallization mass. The obtained solution is stirred for one hour at 25°, after which it is stirred into a saturated aqueous sodium chloride solution, and the precipitated cobalt-containing azo dyestuff filtered off and dried at 40–45°. A brown-yellow powder is obtained which dissolves with yellow coloration in water and which dyes wool, silk, polyamide fibers and leather from a neutral to weakly acid bath in greenish yellow shades which are fast to light, fulling, washing and perspiration. It corresponds to the formula

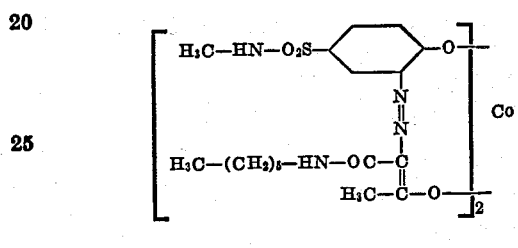

EXAMPLE 2

The diazo suspension from 18.8 parts of 2-amino-1-hydroxybenzene-4-sulfonic acid amide is run, at 0–5°, into a well stirred suspension of 25 parts of 1-acetoacetylamino-2-butyl-butane, 40 parts of sodium carbonate, 27 parts of aqueous sodium hydroxide solution of 30% strength and 300 parts of water. Upon completion of the coupling, the precipitated monoazo dyestuff is filtered off and dried at 35–40°. The product is a reddish yellow powder which dissolves with yellow coloration in dilute aqueous sodium hydroxide solution and with greenish yellow coloration in concentrated sulfuric acid.

8.6 parts of the so-obtained monoazo dyestuff are metallized after the manner described in Example 1, with the aid of cobalt-sodium-tartrate. The obtained cobalt complex compound is soluble with yellow coloration in water; it dyes wool, silk, synthetic polyamide fibers and leather in greenish yellow shades which are fast to light, fulling, washing and perspiration. It corresponds to the formula:

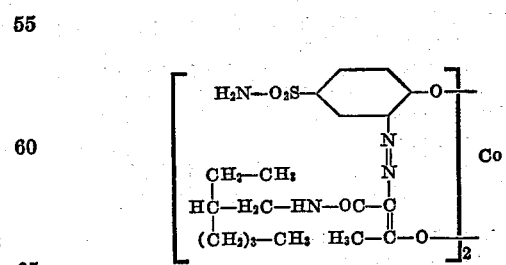

The following table sets forth additional dyestuffs which can be prepared after the manner set forth in Example 1. These dyestuffs are characterized in the table by the respective diazo and azo components and by the shades of the dyeings of the corresponding cobalt complex compounds on wool. The identical shades are obtained on silk and on synthetic polyamide fibers.

Table

| Example No. (1) | Diazo component (2) | Azo component (3) | Shade of the cobalt complex compound on wool (4) |
|---|---|---|---|
| 3 | 2-amino-1-hydroxybenzene-4-sulfonic acid amide | 1-acetoacetylamino-1-dimethyl-3-dimethyl-butane. | Greenish yellow. |
| 4 | 2-amino-1-hydroxy-4-ethylsulfonylbenzene | ....do | Do. |
| 5 | 2-amino-1-hydroxybenzene-4-sulfonic acid amide | 1-acetoacetylamino-octane | Do. |
| 6 | 2-amino-1-hydroxy-4-butylsulfonylbenzene | ....do | Do. |
| 7 | 2-amino-1-hydroxybenzene-4-sulfonic acid methylamide. | ....do | Do. |
| 8 | 2-amino-1-hydroxybenzene-4-sulfonic acid amide | 1-acetoacetylamino-decane | Do. |
| 9 | ....do | Mixture of 50% of 1-acetoacetylamino-dodecane and 50% of 1-acetoacetylamino-pentadecane. | Do. |
| 10 | ....do | Mixture of 75% of 1-acetoacetylamino-octane and 25% of 1-acetoacetylamino-octadecane. | Do. |
| 11 | 2-amino-1-hydroxybenzene-4-sulfonic acid amide | Mixture of 40% of 1-acetoacetylamino-dodecane, 40% of 1-acetoacetylaminotetradecane and 20% of 1-acetoacetylamino-pentadecane. | Do. |
| 12 | ....do | 1-acetoacetylaminododecane | Do. |
| 13 | ....do | 1-benzoylacetylamino-octane | Do. |
| 14 | ....do | 1-(3'-bromo)-benzoyl-acetylamino-hexane | Do. |
| 15 | ....do | 1-acetoacetylaminohexane | Do. |
| 16 | 2-amino-1-hydroxybenzene-4-sulfonic acid methylamide. | 1-acetoacetylamino-1-dimethyl-3-dimethyl-butane. | Do. |
| 17 | 2-amino-1-hydroxybenzene-4-sulfonic acid-(3'-methoxy)-propylamide. | 1-acetoacetylaminohexane | Do. |
| 18 | 2-amino-1-hydroxybenzene-4-sulfonic acid-(3'-ethoxy)-propylamide. | 1-(4'-nitro)-benzoyl-acetylamino-octane | Do. |
| 19 | 2-amino-1-hydroxybenzene-4-sulfonic acid morpholylamide. | 1-acetoacetylaminohexane | Do. |
| 20 | 2-amino-1-hydroxybenzene-4-sulfonic acid pyrrolidylamide. | ....do | Do. |
| 21 | 2-amino-1-hydroxy-6-methylbenzene-4-sulfonic amide. | ....do | Do. |
| 22 | 2-amino-1-hydroxy-6-acetylaminobenzene-4-sulfonic acid amide. | ....do | Do. |
| 23 | 2-amino-1-hydroxybenzene-4-sulfonic acid-(2'-methoxy)-ethylamide. | 1-(2'-chloro)-benzoylacetylamino-hexane | Do. |
| 24 | 2-amino-1-hydroxybenzene-4-sulfonic acid-(2'-ethoxy)-ethylamide. | 1-(4'-fluoro)-benzoylacetylamino-octane | Do. |
| 25 | 2-amino-1-hydroxybenzene-4-sulfonic acid phenylamide. | 1-acetoacetylaminohexane | Do. |
| 26 | 2-amino-1-hydroxybenzene-4-sulfonic acid-[4'-(3"-methoxy)-propylsulfamido]-phenylamide. | ....do | Do. |
| 27 | 2-amino-1-hydroxybenzene-4-sulfonic acid-(4'-methyl)-phenylamide. | ....do | Do. |
| 28 | 2-amino-1-hydroxybenzene-4-sulfonic acid-(2'-chloro)-phenylamide. | ....do | Do. |
| 29 | 2-amino-1-hydroxybenzene-4-sulfonic acid-(3'-sulfamido)-phenylamide. | ....do | Do. |
| 30 | 2-amino-1-hydroxybenzene-4-sulfonic acid-(4'-methylsulfamido)-phenylamide. | ....do | Do. |

The formulae of representative dyestuffs of the said table are as follows:

EXAMPLE 9

Mixture of the cobalt-containing azo dyestuffs corresponding to the formulae

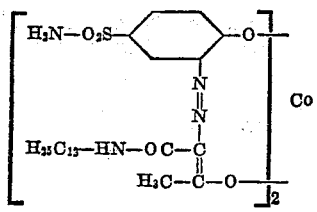

and

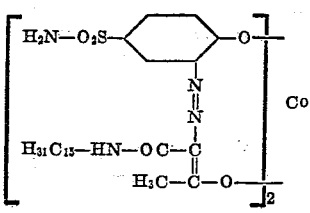

and

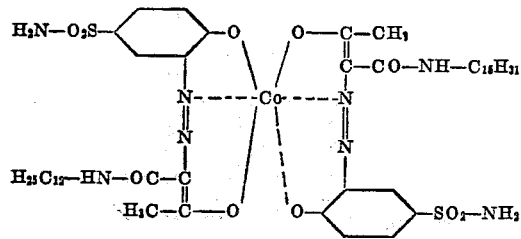

EXAMPLE 17

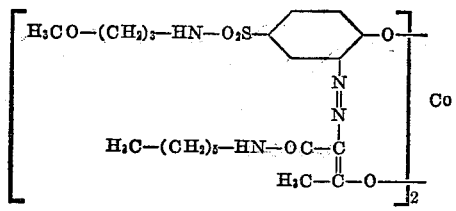

EXAMPLE 31

8.6 parts of the monoazo dyestuff, obtainable according to the data of Example 1 by coupling diazotized 2-amino-1-methoxybenzene-4-sulfonic acid amide with 1-acetoacetylamino-octane, are heated to 128–131° for 8 hours in 80 parts of ethylpolyglycol, together with 2.8 parts of crystalline cobalt sulfate and 8 parts of crystalline sodium acetate. The resultant solution is poured into 100 parts of aqueous sodium chloride solution of 10% strength, and the precipitated metal complex compound is separated by decantation from the mother liquor. The dyestuff is then dissolved in hot dilute sodium hydroxide solution. The solution is freed by filtration from a small quantity of undissolved matter, the cobalt-containing azo dyestuff is precipitated from the filtrate by the addition of sodium chloride, and this precipitate is filtered off and dried at 60°. It corresponds to the formula $$\left[ \begin{array}{c} H_2N-O_2S-\phantom{X}-O- \\ \phantom{XX}N \\ \phantom{XX}\parallel \\ \phantom{XX}N \\ H_3C-(CH_2)_7-HN-OC-C \\ \phantom{XXXXX}H_3C-C-O- \end{array} \right]_2 Co$$

and possesses the same properties as the product obtainable according to Example 5.

EXAMPLE 32

100 parts of wool are entered into a bath consisting of 5 parts of ammonium acetate and 4000 parts of water, and the wool is digested therein for 15 minutes at 50°. Thereupon a concentrated aqueous solution of 1 part of the cobalt-containing azo dyestuff obtainable according to Example 1 is added to the bath, which is then heated to boiling in the course of 30 minutes. The bath is maintained at the boil for an additional 30 minutes, after which it is cooled and the dyed material withdrawn, rinsed with cold water and dried.

Polyamide fibers, such as nylon and Perlon, can be dyed in the same way.

The hereinbefore-mentioned cobalt compounds are Co(II) compounds.

Having thus disclosed the invention what is claimed is:

1. A cobalt-containing dye comprising the azo dyestuff which corresponds to the formula $$\left[ \begin{array}{c} z-\phantom{X}-y \\ \phantom{XX}-O- \\ \phantom{XX}N \\ \phantom{XX}\parallel \\ \phantom{XX}N \\ R_1HN.OC-C \\ R_2-C-O- \end{array} \right]_2 Co_n$$

wherein $n$ is less than 2, $y$ is selected from the group consisting of H, $CH_3$ and $-NHCOCH_3$, $z$ is selected from the group consisting of $-SO_2-$alkyl, $-SO_2NH_2$, $-SO_2-NH.$alkyl, $-SO_2-NH.$alkoxyalkyl, $-SO_2-NH-\langle\rangle$, $-SO_2-NH-\langle\rangle_{Cl}$ $-SO_2-NH-\langle\rangle_{CH_3}$, $-SO_2-NH-\langle\rangle_{SO_2NH_2}$ $-SO_2-NH-\langle\rangle_{SO_2-NH.alkyl}$ $-SO_2-NH-\langle\rangle_{SO_2-NH.alkoxyalkyl}$, $-SO_2-N\langle^{CH_2-CH_2}_{CH_2-CH_2}\rangle$ and $-SO_2-N\langle^{CH_2-CH_2}_{CH_2-CH_2}\rangle O$ $R_1$ is an alkyl group with at least 6 and at most 18 carbon atoms, and $R_2$ is a member selected from the group consisting of lower alkyl and aryl.

2. A cobalt-containing dye according to claim 1, wherein the azo dyestuff moieties are identical.

3. A cobalt-containing dye according to claim 1, wherein the azo dyestuff moieties are different.

4. A cobalt-containing dye according to claim 1, wherein the azo dyestuff moieties are identical and $n$ is one.

5. A cobalt-containing dye according to claim 1, wherein the azo dyestuff moieties are different and $n$ is one.

6. A cobalt-containing dye corresponding to the formula $$\left[ \begin{array}{c} H_3C-HN-O_2S-\phantom{X}-O- \\ \phantom{XX}N \\ \phantom{XX}\parallel \\ \phantom{XX}N \\ H_3C-(CH_2)_5-HN-OC-C \\ \phantom{XXXXX}H_3C-C-O- \end{array} \right]_2 Co$$

7. A cobalt-containing dye corresponding to the formula $$\left[ \begin{array}{c} H_2N-O_2S-\phantom{X}-O- \\ \phantom{XX}N \\ CH_2-CH_3 \phantom{XX}\parallel \\ \phantom{X}| \phantom{XXX}N \\ HC-H_2C-HN-OC-C \\ | \\ (CH_2)_3-CH_3 \phantom{X} H_3C-C-O- \end{array} \right]_2 Co$$

8. A cobalt-containing dye corresponding to the formula $$\left[ \begin{array}{c} H_3CO-(CH_2)_3-HN-O_2S-\phantom{X}-O- \\ \phantom{XXXXXXX}N \\ \phantom{XXXXXXX}\parallel \\ \phantom{XXXXXXX}N \\ H_3C-(CH_2)_5-HN-OC-C \\ \phantom{XXXXXXXXX}H_3C-C-O- \end{array} \right]_2 Co$$

9. A cobalt-containing dye corresponding to the formula $$\left[ \begin{array}{c} H_2N-O_2S-\phantom{X}-O- \\ \phantom{XX}N \\ \phantom{XX}\parallel \\ \phantom{XX}N \\ H_3C-(CH_2)_7-HN-OC-C \\ \phantom{XXXXX}H_3C-C-O- \end{array} \right]_2 Co$$

10. A cobalt-containing dye consisting of a mixture of the cobalt-containing azo dyestuffs corresponding to the formulae $$\left[ \begin{array}{c} H_2N-O_2S-\phantom{X}-O- \\ \phantom{XX}N \\ \phantom{XX}\parallel \\ \phantom{XX}N \\ H_{25}C_{12}-HN-OC-C \\ \phantom{XXX}H_3C-C-O- \end{array} \right]_2 Co$$

and $$\left[ \begin{array}{c} H_2N-O_2S-\phantom{X}-O- \\ \phantom{XX}N \\ \phantom{XX}\parallel \\ \phantom{XX}N \\ H_{31}C_{15}-HN-OC-C \\ \phantom{XXX}H_3C-C-O- \end{array} \right]_2 Co$$

and
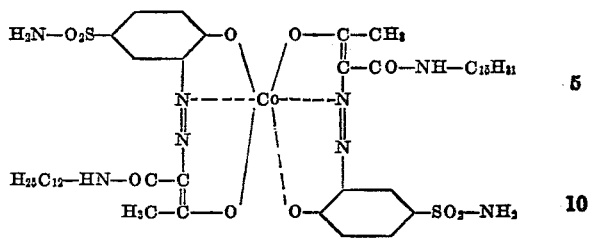
References Cited in the file of this patent
UNITED STATES PATENTS
| | | | |
|---|---|---|---|
| 2,305,095 | Mackenzie | | Dec. 15, 1942 |
| 2,565,898 | Widmer et al. | | Aug. 28, 1951 |
| 2,734,895 | Zickendraht et al. | | Feb. 14, 1956 |